US010038715B1

(12) United States Patent
Majkowski et al.

(10) Patent No.: US 10,038,715 B1
(45) Date of Patent: Jul. 31, 2018

(54) IDENTIFYING AND MITIGATING DENIAL OF SERVICE (DOS) ATTACKS

(71) Applicant: Cloudflare, Inc., San Francisco, CA (US)

(72) Inventors: Marek Przemyslaw Majkowski, Warsaw (PL); Gilberto Bertin, London (GB); Christopher Philip Branch, Romford (GB); John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 15/793,569

(22) Filed: Oct. 25, 2017

Related U.S. Application Data

(60) Provisional application No. 62/539,961, filed on Aug. 1, 2017.

(51) Int. Cl.
*H04L 29/06* (2006.01)

(52) U.S. Cl.
CPC ...... *H04L 63/1458* (2013.01); *H04L 63/0227* (2013.01); *H04L 63/1416* (2013.01); *H04L 63/1425* (2013.01); *H04L 63/1466* (2013.01)

(58) Field of Classification Search
CPC ............. H04L 63/1458; H04L 63/0227; H04L 63/1416; H04L 63/1425; H04L 63/1466
USPC .......................................................... 726/23
See application file for complete search history.

(56) References Cited

U.S. PATENT DOCUMENTS

| 7,668,969 | B1 * | 2/2010 | Kashyap | H04L 49/10 370/360 |
| 7,860,006 | B1 * | 12/2010 | Kashyap | H04L 41/0893 370/235 |
| 7,865,954 | B1 * | 1/2011 | Phoha | H04L 63/1466 709/224 |
| 2003/0084344 | A1 * | 5/2003 | Tarquini | H04L 63/1416 726/4 |

(Continued)

OTHER PUBLICATIONS

Transmission Control Protocol, DARPA Internet Program Protocol Specification, RFC: 793, by Information Sciences Institute, University of Southern California, Sep. 1981, 91 pages.

(Continued)

*Primary Examiner* — Matthew T Henning
(74) *Attorney, Agent, or Firm* — Nicholson De Vos Webster & Elliott LLP

(57) ABSTRACT

A server receives a SYN packet and generates a SYN packet signature from the SYN packet. The server generates multiple aggregate signatures for the SYN packet signature that each include a generalized value for at least one element, where each aggregate signature has a different level of specificity and corresponds with a different fingerprint table. The server sequentially iterates through the fingerprint tables starting with the most specific aggregate signature and the most specific fingerprint table until a match exceeding a counter threshold is found, if any. If an aggregate signature does not match a fingerprint in a fingerprint table, the aggregate signature is added to that fingerprint table and an initial value for the counter is set. A bytecode using an attack fingerprint as input is generated in a form understandable by a network filter, and installed in a network filter.

21 Claims, 6 Drawing Sheets

(56) References Cited

U.S. PATENT DOCUMENTS

| | | | |
|---|---|---|---|
| 2003/0226034 A1* | 12/2003 | Howard | H04L 63/1408 726/22 |
| 2005/0018618 A1* | 1/2005 | Mualem | H04L 63/1458 370/252 |
| 2005/0083935 A1* | 4/2005 | Kounavis | H04L 45/00 370/392 |
| 2007/0039044 A1* | 2/2007 | Moonen | H04L 63/0227 726/13 |
| 2015/0074792 A1* | 3/2015 | Tarreau | H04L 63/0227 726/13 |
| 2016/0323302 A1* | 11/2016 | Teixeira | H04L 63/1416 |
| 2017/0244636 A1* | 8/2017 | Chen | H04L 45/745 |

OTHER PUBLICATIONS

Marek Majkowski, BPF—the forgotten bytecode, Cloudflare Blog, Cloudflare, Inc., May 21, 2014, 8 pages.

Marek Majkowski, Introducing the BPF Tools, Cloudflare Blog, Cloudflare, Inc., Jul. 3, 2014, 8 pages.

Steven McCanne et al., The BSD Packet Filter: A New Architecture for User-level Packet Capture, Dec. 19, 1992, Winter USENIX—Jan. 1993—San Diego, CA, 11 pages.

William Stearns, IPTables U32 Match Tutorial, Dec. 18, 2003, 9 pages.

* cited by examiner

IDENTIFYING AND MITIGATING DENIAL OF SERVICE (DOS) ATTACKS

CROSS-REFERENCE TO RELATED APPLICATIONS

This application claims the benefit of U.S. Provisional Application No. 62/539,961, filed Aug. 1, 2017, which is hereby incorporated by reference.

TECHNICAL FIELD

Embodiments of the invention relate to the field of network communications; and more specifically, to identifying and mitigating denial of service (DoS) attacks.

BACKGROUND

TCP, defined for example in RFC 793, is a widely used protocol of the Internet that allows for reliable and ordered delivery of data. For example, web browsers commonly use TCP when connecting to servers on the Internet. The TCP segment includes a header that includes a number of fields including source port, destination port, sequence number, acknowledgement number, data offset, reserved, control bits, window, checksum, urgent pointer, options, padding, and a field for the data. The TCP segment is commonly encapsulated into an IP or IPv6 packet whose header includes a number of fields including among others source IP address, destination IP address, and options. TCP uses sequence numbers to identify the order of data such that the data may be received out of order and reassembled.

A client establishes a TCP connection with a server through a series of messages commonly referred to as a handshake. The handshake includes the client transmitting a TCP SYN message to the server which initiates a TCP connection to the server. The server responds with a TCP SYN-ACK message which acknowledges the TCP SYN message and sets an initial sequence number (ISN) to a value chosen by the server. The client responds with a TCP ACK message that acknowledges the TCP SYN-ACK message and includes an acknowledgement number that is the ISN incremented by one. After these three messages, the TCP connection between the client and the server is established. TCP packets also include a TCP checksum which is the ones' complement sum of certain fields in the TCP header.

A fairly common distributed denial of service (DDoS) attack is known as a SYN flood that might be launched by clients (which may be participating in a botnet) that causes a high rate of incomplete TCP connections. For example, a half-open connection is a connection where the client has sent SYN message, the server has responded with a SYN-ACK message, and the server is waiting for the client to respond with an ACK message. In a SYN flood attack, malicious client(s) typically send many SYN messages to a TCP server with no intention of ever responding to the SYN-ACK message with an ACK message. The server may maintain state for all half-open connections (e.g., waiting for the client to respond with a TCP ACK message to complete the handshake) and the SYN flood may cause memory pressure for the TCP server (e.g., an overflowing connection tracking table, an overflowing SYN queue, etc), which may lead to the server failing or denying service to legitimate clients, and it may create a high interrupt rate from the network interface card on the attacked server. Thus, these incomplete TCP connections consume resources on TCP servers such as CPU time and/or memory usage.

A SYN packet can be represented in a signature format. For example, p0f is a signature format that consists of colon separated values that describes a SYN packet in a human-readable way. For instance, the signature format may include the following elements: the IP version (e.g., IPv4 or IPv6), an estimated initial TTL value, an IP options length, a maximum segment size (MSS) specified in the TCP options, a window size specified in the TCP header, a window scale specified TCP options, a TCP options layout that lists the TCP options in the order they are seen in the TCP packet (e.g., no-operation, MSS, window scaling, selective ACK permitted, selective ACK, timestamp, end of options followed by x bytes of padding), zero or more quirks (comma separated list of unusual (e.g., ACK number set in a non ACK packet) or incorrect (e.g., malformed TCP options) characteristics of a packet (e.g., "don't fragment" (DF) bit is set in IP header, DF bit is set and IP identification field is non zero, DF bit is not set and IP identification is zero, explicit congestion flag is set, reserved ("must be zero") field in IP header is not zero, flow label in IPv6 header is non-zero, sequence number is zero, ACK field is non-zero but ACK flag is not set, ACK field is zero but ACK flag is set, URG field is non-zero but URG flag not set, URG flag is set, PUSH flag is set, timestamp 1 is zero, timestamp 2 is non-zero in a SYN packet, non-zero data in options segment, excessive window scaling factor (window scale greater than 14), match a packet sent from the Linux network stack (IP.id field equal to TCP.ts1 xor TCP.seq_num), and malformed TCP options), and payload class (TCP payload size). Each SYN packet signature may be in the form of a string with separated values such as colon separated values. The SYN packet signatures may be compared against a fingerprint database that is compiled by an expert, and is static.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
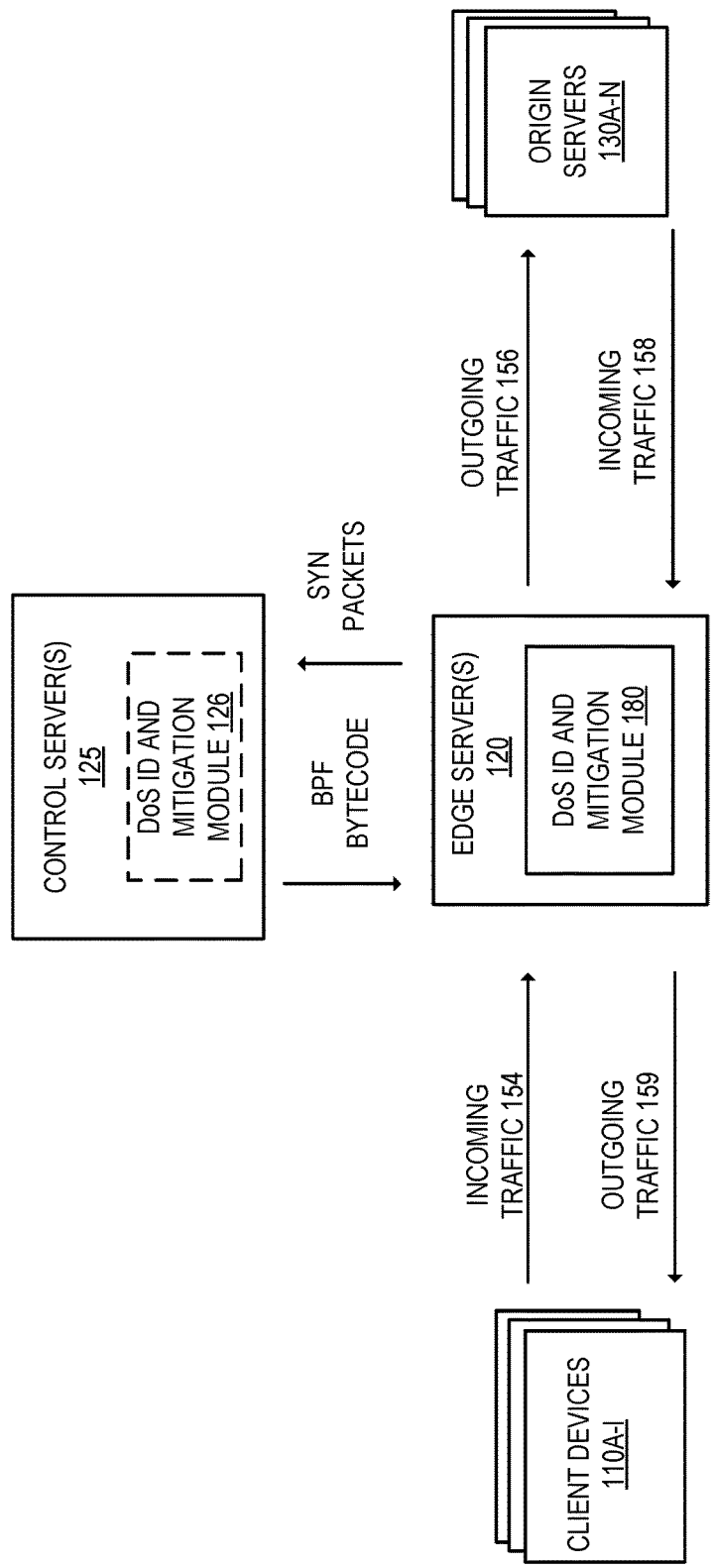
FIG. 1 illustrates an exemplary system for detecting and mitigating DoS attacks according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A method and apparatus for identifying and mitigating denial of service attacks is described. In an embodiment, to mitigate against a SYN flood attack, analysis is performed on incoming SYN packets to determine whether they are malicious SYN packets (e.g., part of an attack) or legitimate traffic. SYN packets determined to be malicious can then be treated differently than legitimate SYN packets. In an embodiment, the analysis includes analyzing packet samples and determining whether there is a pattern or trend that is common to the attack traffic, and treating the attack traffic differently than other traffic.

Signatures are generated for SYN packets and analyzed to determine an aggregate signature that covers a largest portion of the attack traffic. Each SYN packet signature may describe the SYN packet and include one or more of the following elements: the IP version (e.g., IPv4 or IPv6), an estimated initial TTL value, an IP options length, a maximum segment size (MSS) specified in the TCP options, a window size specified in the TCP header, a window scale specified TCP options, a TCP options layout that lists the TCP options in the order they are seen in the TCP packet (e.g., no-operation, MSS, window scaling, selective ACK permitted, selective ACK, timestamp, end of options followed by x bytes of padding), zero or more quirks (comma separated list of unusual (e.g., ACK number set in a non ACK packet) or incorrect (e.g., malformed TCP options) characteristics of a packet (e.g., "don't fragment" (DF) bit is set in IP header, DF bit is set and IP identification field is non zero, DF bit is not set and IP identification is zero, explicit congestion flag is set, reserved ("must be zero") field in IP header is not zero, flow label in IPv6 header is non-zero, sequence number is zero, ACK field is non-zero but ACK flag is not set, ACK field is zero but ACK flag is set, URG field is non-zero but URG flag not set, URG flag is set, PUSH flag is set, timestamp 1 is zero, timestamp 2 is non-zero in a SYN packet, non-zero data in options segment, excessive window scaling factor (window scale greater than 14), match a packet sent from the Linux network stack (IP.id field equal to TCP.ts1 xor TCP.seq_num), and malformed TCP options), and payload class (TCP payload size). Each SYN packet signature may be in the form of a string with separated values such as colon separated values.

In an embodiment, a signature generalization process is performed among multiple SYN packet signatures to generalize multiple SYN packet signatures to create an aggregate signature. The aggregate signature includes the same elements as the SYN packet signatures but includes zero or more values that has been changed to a generalized value that may match multiple different SYN packets potentially having different SYN packet signatures. As an example, a generalized value may be a wildcard value that covers all values or may be an expression that will match multiple different packets such as the value MSS*17 that will match packets where the MSS value multiplied 17 times is equal to the window value.

In an embodiment, the signature aggregation process determines the commonalities between the signatures and generalizes the signature to cover a large part of the traffic. For example, the aggregation process may include a counter-based algorithm for estimating frequencies of the SYN packet signatures or aggregated SYN packet signatures. For instance, consider the following SYN packet signatures that have a colon separated value format, where the format follows: version:initial TTL:IP options length:MSS:window size,window scale:TCP options layout:quirks:TCP payload size.

(1) 4:128:0:1440:mss*10,6:mss,sok,ts,nop,ws:df,id+:0;
(2)    4:64:0:1440:mss*10,6:mss,sok,ts,nop,ws:df,id+:0; and
(3) 4:32:0:1440:mss*10,6:mss,sok,ts,nop,ws:df,id+:0.

These three SYN packet signatures differ only in the second element. That is, these SYN packet signatures are the same except for the second element. The second element in this example represents the estimated initial TTL value. This field is often randomized in malicious SYN packets. The aggregation process aggregates these SYN packet signatures using a wildcard value (meaning any value matches) for the second element to generate the following aggregate signature:

(4) 4:*:0:1440:mss*10,6:mss,sok,ts,nop,ws:df,id+:0.

The second element is not the only element that can be used as criteria for being generalized. In addition, multiple criteria may be generalized. For instance, consider the following SYN packet signatures:

(5) 4:64:0:1460:mss*10,6:mss,sok,ts,nop,ws:df,id+:0;
(6) 4:64:0:1460:8192,8:mss,sok,ts,nop,ws:df,id+:0 and
(7) 4:64:0:1460:65535,*:mss,sok,ts,nop,ws:df,id+:0.

These SYN packet signatures differ in the element representing the window size and window scale values. The aggregation process aggregates these SYN packet signatures using a wildcard value for the window size and window scale values to generate the following aggregate signature:

(8) 4:64:0:1460: *,*:mss,sok,ts,nop,ws:df,id+:0.

In an embodiment, heuristic analysis is used to determine which element(s) of the SYN packet signatures to change to a generalized value for the aggregate signature. For instance, through heuristic analysis, it is seen that there are certain elements that attackers often randomize and other fields that the attackers generally do not change. For example, attackers often change the window size element but often do not change the order of TCP options. For an element that attackers often randomize (such as the window size element), a wildcard may be chosen in place of that value for the aggregate signature. For elements that often do not change such as the order of TCP options, generally those elements are not changed in in the aggregate signature.

In an embodiment, multiple aggregate signatures are generated for the SYN packet. The multiple aggregate signatures may each be at a different level of specificity. For example, a first aggregate signature can be generated that matches only perfectly matching SYN packets and a second aggregate signature can be generated that matches relatively less distinct SYN packets, and may include more generalized fields.

In an embodiment, each different aggregate signature generated for the SYN packet is input into a different fingerprint table according to the specificity if that fingerprint is not already included in that table. A fingerprint table includes fingerprints and corresponding counters. A fingerprint is an aggregated signature that is included in the fingerprint table. An attack fingerprint, which will be described in greater detail later, is a fingerprint whose corresponding counter exceeds a threshold. The fingerprint tables are used to find frequent items (frequently repeated aggregated SYN signatures). For instance, if N aggregate signatures are generated for each SYN packet, that usually requires N fingerprint tables. If each fingerprint table can hold K (typically greater than 10, such as 32) fingerprints sharing common aggregation criteria, then the system will detect at most N*K attack fingerprints. The fingerprint tables are usually consulted in order, starting from the one containing the most specific aggregate signatures (expected to hold aggregate signatures with the least number of generalized fields) and ending with the table containing the least specific aggregate signatures (expected to cover the largest number of generalized fields). For example, the most specific fingerprint will be an entry in the most specific fingerprint table, the next most specific fingerprint will be an entry in the next most specific fingerprint table, and so on. In an embodiment, heuristic analysis is used to determine the order of the fingerprints, since assessing this requires experience, (from the most specific to the most generic according to the heuristic analysis) to put into fingerprint tables.

The aggregate signatures are iterated across the N fingerprint tables respectively, starting from the most specific table to the least specific table until a match exceeding a threshold is found, if any. If there is a match, a counter for that aggregate signature is increased. If the counter exceeds a threshold, the iteration stops. Thus, for a given SYN packet, further less specific aggregate signatures in remaining fingerprint tables will not have their counters incremented. Therefore, only the counters for the most specific aggregate signatures, until one exceeding threshold is found, (if any) are incremented. This prevents the counters in the less-specific fingerprint tables from growing if there is a match in a more-specific fingerprint table. An "attack" is determined for an aggregate signature if the counter for a particular entry (fingerprint) exceeds a threshold (e.g., a traffic volume threshold such as a packet-per-second value). Such aggregate signature is sometimes described herein as an attack fingerprint.

The combination of the heuristic analysis for generating the aggregate signatures and their order in the fingerprint tables with the stacking/counting of the fingerprints in the fingerprint tables allows to generate the most specific fingerprint that covers the attack traffic while at the same time covering the widest part of the attack traffic. Also, the fingerprint is generic enough that it can detect attacks with randomized fields. The technique described herein scales well, unlike implementations of typical hierarchical heavy hitter algorithms that do not scale because of the need for computing all the nodes and the counter exponentially jumping with each added criterion.

A fingerprint that has been determined to match attack traffic is converted into a format understandable by a network filter that can be deployed on a set of one or more edge machines and used to match attack traffic that correspond with the fingerprint. Based on the matching of the traffic, the packets determined to be part of attack traffic may be treated differently on the edge machines than other traffic. For example, those SYN packets can be rate limited or dropped. In an embodiment, the network filter is an implementation of a Berkeley Packet Filter (BPF) (e.g., iptables xt_bpf module)) and the format understandable by the network filter is BPF bytecode. For example, the fingerprint generating algorithm may take as input a fingerprint, parse and split the elements into matches, and output a packet filter expression that is understandable by the network filter.

In an embodiment, the fingerprints are generated such that during normal operation (without an attack), each fingerprint will cover less than a predefined percentage of SYN packets. For instance, in a specific implementation where K is the size of one table, and K is greater than one (e.g., typically greater than 10 such as 32), the generated fingerprint will likely cover less than 1/K of the SYN packets during normal operation. However, the fingerprint is also generated such that during an attack, the fingerprint will cover more than the predefined percentage of SYN packets (e.g., more than 1/K of the SYN packets). It is possible for the fingerprint will cover more than the predefined percentage of SYN packets during normal operation (e.g., more than the 1/K of the SYN packets), but not exceed the attack threshold. This guards against legitimate streams that are larger than 1/K but do not exceed an attack threshold. Also, the fingerprint is generic enough that it can detect attacks with randomized fields.

The DoS detection and mitigation described herein may be performed by a server (or a group of servers) that receive SYN packets. In an embodiment, the techniques described herein are performed in a cloud-based proxy service according to an embodiment. The cloud-based proxy service is available as a service over the Internet and does not require customers (e.g., domain owners and/or personnel working on behalf of domain owners) to install additional hardware or software to support the service. In one embodiment, the cloud-based proxy service is provisioned through a change in Domain Name System (DNS) records of the customers.

FIG. 1 illustrates an exemplary system for detecting and mitigating DoS attacks according to an embodiment. The system illustrated in FIG. 1 includes a set of edge server(s) 120 that are situated between the client devices 110A-I and the origin servers 130A-N. In an embodiment, the edge server(s) 120 are reverse proxy servers. Certain network traffic is received and processed through the set of edge server(s) 120. For example, web traffic (e.g., HTTP requests/responses, HTTPS requests/responses, SPDY requests/responses, etc.) for domains of the origin servers 130A-N may be received and processed at the edge server(s) 120.

The client devices 110A-I are computing devices (e.g., laptops, desktops, smartphones, mobile phones, wearable devices, tablets, gaming systems, set top boxes, etc.) that are capable of transmitting and receiving network traffic. The network traffic may be legitimate network traffic or illegitimate network traffic (e.g., traffic that is part of a denial-of-service (DoS) attack). The client devices 110A-I may execute a client network application that is capable of transmitting network traffic. For example, the client network application may be a web browser or other application that can access network resources (e.g., web pages, images, word processing documents, PDF files, movie files, music files, or other computer files) using the client network application. The client network application may also be a scripting application or other application that may be participating in a DoS attack.

The origin servers 130A-N are computing devices that may serve and/or generate network resources (e.g., web pages, images, word processing documents, PDF files movie files, music files, or other computer files). An origin server 130A-N may also be another proxy server to the server that serves and/or generates network resources. Although not illustrated in FIG. 1, the network resources of the origin servers 130A-N may be stored separately from the device that responds to the requests.

The edge server(s) 120 receive certain network traffic from the client devices 110A-I that are destined for one of the origin servers 130A-N. For example, an edge server 120 may receive requests for an action to be performed on an identified resource of an origin server (e.g., an HTTP GET request, an HTTP POST request, other HTTP request methods, or other requests to be applied to an identified resource on an origin server) from the client devices 110A-I. As illustrated in FIG. 1, the incoming traffic 154 is received at one of the edge server(s) 120. The incoming traffic 154 includes SYN packets.

The edge server(s) 120 analyze the incoming traffic 154 and take one or more actions on the incoming traffic. Some of the incoming traffic 154 may be part of a DoS attack. The edge server(s) 120 and/or the control server(s) 125 detect and mitigate the DoS attack. Assuming, for example that there is not a threat or a DoS attack, the edge server 120 may transmit the outgoing traffic 156 to the appropriate origin server 130. For example, the edge server may transmit a request (e.g., an HTTP GET request) for a resource of the origin server 130. The origin servers 130A-N respond to the outgoing traffic 156 with the incoming traffic 158. For example, an origin server may transmit a response (e.g., an HTTP response) with the requested resource to the edge server(s) 120. The edge server(s) 120 may analyze the incoming traffic 158 and take one or more actions, including, for example, transmitting the outgoing traffic 159 to the requesting client device. The edge server(s) 120 may also cache resources for the domains and respond to requests from client devices locally if the requested resource is in cache.

In some embodiments, the incoming traffic 154 is received at a particular edge server 120 as a result of a DNS request for a domain resolving to an IP address of that edge server 120 instead of an IP address of the origin server for the domain. By way of example, DNS record(s) for the domain "example.com" may resolve to an IP address of an edge server 120 instead of the origin server handling the domain "example.com". In some embodiments, multiple domains that may be owned by different domain owners may resolve to the same edge server 120 (e.g., the same IP address or a different IP address of the edge server 120).

The system illustrated in FIG. 1 also includes the control server(s) 125 which are operated by the service. The control server(s) 125 are centralized servers that may participate in the DoS detection and mitigation.

Although not illustrated in FIG. 1, in one embodiment the cloud-based proxy service includes multiple nodes (referred herein as "edge service nodes"). Each edge service node may include any of one or more edge servers, one or more control servers, one or more DNS servers (e.g., one or more authoritative name servers), and one or more other pieces of networking equipment (e.g., one or more routers, switches, hubs, etc.). The edge service node may be part of the same physical device or multiple physical devices. For example, the edge server(s), control server(s), and DNS server(s) may be virtual instances running on the same physical device or may be separate physical devices. Each edge service node may be part of a data center or a collocation site.

In some embodiments, the cloud-based proxy service includes multiple edge servers that are geographically distributed. For example, in some embodiments, the service uses multiple edge service nodes that are geographically distributed to decrease the distance between requesting client devices and content. The authoritative name servers may have a same anycast IP address and the edge servers may have a same anycast IP address. As a result, when a DNS request is made, the network transmits the DNS request to the closest authoritative name server (in terms of the routing protocol metrics). That authoritative name server then responds with one or more IP addresses of one or more edge servers within the edge service node. Accordingly, a visitor will be bound to that edge server until the next DNS resolution for the requested domain (according to the TTL (time to live) value as provided by the authoritative name server). In some embodiments, instead of using an anycast mechanism, embodiments use a geographical load balancer to route traffic to the nearest edge service node.

An edge service node, including any of the router(s), switch(es), edge server(s), and DNS server(s) of the node, may receive legitimate traffic and illegitimate traffic. As used herein, illegitimate traffic is traffic that is not meant for a legitimate purpose, even though it may include legitimate content. The illegitimate traffic may be part of a DoS attack. A DoS attack typically involves transmitting a large amount of traffic at an identified target to delay or interrupt the service provided by that target such that the target cannot respond, or responds slowly, to legitimate traffic. The DoS attack may be a distributed DoS (DDoS) attack where multiple clients transmit a large amount of traffic directed at a target. In a DDoS attack, usually the clients are devices that are infected with a virus, Trojan, or other malware that allows an attacker to carry out the attack. Illegitimate traffic may include traffic that is not malformed and is otherwise legitimate but for its intent, which is typically to overload a system to prevent it from servicing other legitimate traffic. For example, the traffic may be a large number of legitimate HTTP requests (much larger than would otherwise be expected) transmitted from a single client or a group of clients that are participating in a DoS attack. A fairly common distributed denial of service (DDoS) attack is known as a SYN flood that is typically launched by multiple clients (which may be participating in a botnet) that causes a high rate of incomplete TCP connections. For example, a half-open connection is a connection where the client has sent SYN message, the server has responded with a SYN-ACK message, and the server is waiting for the client to respond with an ACK message. In a SYN flood attack, malicious client(s) typically send many SYN messages to a TCP server with no intention of ever responding to the SYN-ACK message with an ACK message. The server may maintain state for all half-open connections (e.g., waiting for the client to respond with a TCP ACK message to complete the handshake) and the SYN flood may consume all of the available memory for TCP on the server (an overflowing state table), which may lead to the server failing or denying service to legitimate clients, and it may create a high interrupt rate from the network interface card on the attacked server. Thus, these incomplete TCP connections consume resources on web servers both in CPU time and memory space. At any given time, the target for a DoS attack may be at one of the domains serviced by the service, at IP address(es) of the domains serviced by the service, at a domain of the service (e.g., the domain hosting the service), and/or at an IP address of an edge server 120.

The cloud-based proxy service identifies and mitigates DoS attacks. The identification and/or mitigation may be performed in coordination with multiple components of the cloud-based proxy service (e.g., at one or more edge service nodes). For example, in an embodiment, the edge server(s) 120 and/or the control server(s) 125 identify DoS attacks and one or more mitigation actions may be taken by the edge server(s) 120 and/or the control server(s) 125 (e.g., installing rules such as rate limiting, null routing, etc., on the edge servers and/or the router(s) or switch(es)). In an embodiment, the edge server(s) 120 each include the DoS identification and mitigation module 180 that identifies DoS attacks and takes steps to mitigate their effectiveness. In one embodiment, the control server(s) 125 each include the DoS identification and mitigation module 126 that identifies DoS attacks and takes steps to mitigate their effectiveness. Thus, in some embodiments the edge server(s) 120 may identify DoS attacks and perform mitigation and in other embodiments the control server(s) 125 may identify DoS attacks and cause mitigation actions to be performed. The edge server(s) 120 and the control server(s) 125 may cooperate to identify DoS attacks and cause mitigation actions to be performed. For instance, the edge server(s) 120 may receive SYN packets and send samples to the control server(s) 125 for analysis (e.g., using sFlow). The control server(s) 125 may then aggregate the SYN packet samples from the edge server(s) 120 and determine whether there is an attack using techniques described herein, generate bytecode to mitigate the attack, and cause the bytecode to be installed on network filters on the edge server(s) 120.

After identifying an attack, the DoS identification and mitigation module 180 and/or 126 causes one or more mitigation actions to be performed, which may include rate limiting, broadcasting filtering rules to network equipment (e.g., routers, switches, etc.) in the wide area network (WAN) upstream and/or downstream from the edge server, changing the routing such that traffic for the targeted IP address points to a particular data center, set of data centers, or a hardware device that is dedicated to handling attacks, presenting one or more challenges to visitors, and/or increasing the amount of resources and/or the types of resources being cached for the targeted domain. These are example mitigation action(s), and other mitigation actions may be performed in some embodiments.

Figure 2:
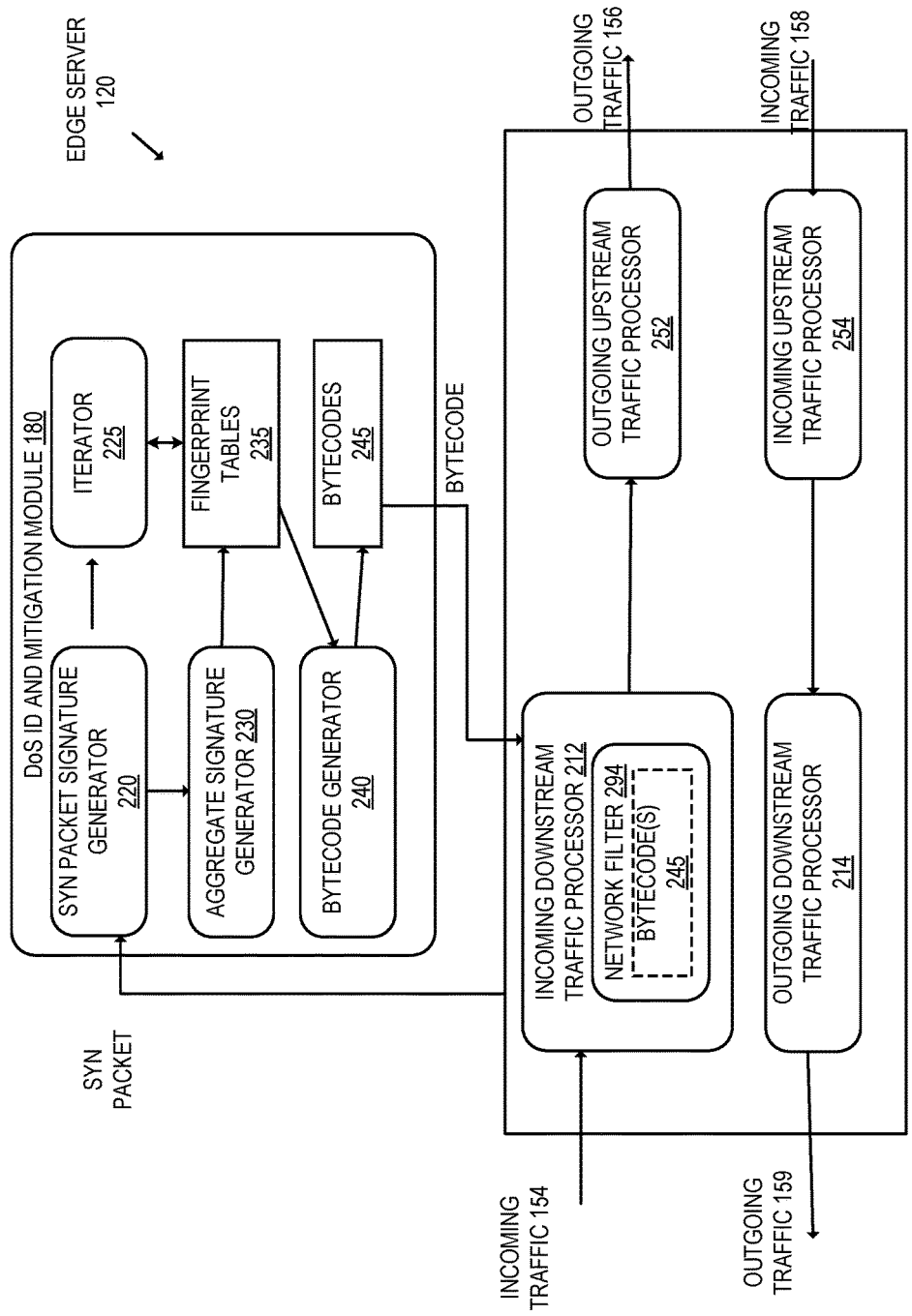
FIG. 2 is a block diagram that illustrates exemplary software architecture of an edge server according to one embodiment.

FIG. 2 is a block diagram that illustrates exemplary software architecture of an edge server 120 according to one embodiment. The architecture illustrated in FIG. 2 is exemplary, and other architectures may be used in other embodiments. The edge server 120 includes the incoming downstream traffic processor 212, the outgoing upstream traffic processor 252, the outgoing downstream traffic processor 214, the incoming upstream traffic processor 254, and the DoS ID and mitigation module 180. The use of the terms downstream and upstream is relative to the edge server. An example of devices that are upstream of the edge server is the backend servers that host content (e.g., the origin servers). Examples of devices that are downstream of the edge server are the client devices that request content from the backend servers.

The incoming downstream traffic processor 212 receives and processes traffic from devices downstream from the edge server 120. For example, the incoming downstream traffic processor 212 receives incoming traffic 154 from the client devices 110A-I. The incoming traffic 154 may include SYN packets. The outgoing downstream traffic processor 214 formats and transmits traffic to devices downstream from the edge server 120 (e.g., the outgoing traffic 159 to the client devices 110A-I). The outgoing upstream traffic processor 252 formats and transmits traffic to devices that are upstream of the edge server 120. For example, the outgoing upstream traffic processor 252 transmits the outgoing traffic 156 to the origin servers 130A-N. The incoming upstream traffic processor 254 receives and processes traffic from devices that are upstream of the edge server 120 (e.g., the incoming traffic 158 from the origin servers 130A-N).

The edge server 120 analyzes incoming traffic for detecting and/or mitigating DoS attacks, in an embodiment. To mitigate against a SYN flood attack, the edge server 120 may analyze incoming SYN packets to determine whether they are malicious SYN packets (e.g., part of an attack) or legitimate traffic. SYN packets determined to be malicious can then be treated differently than legitimate SYN packets. In an embodiment, the analysis includes analyzing packet samples and determining whether there is a pattern or trend that is common to the attack traffic, and treating the attack traffic differently than other traffic.

Although FIG. 2 describes an edge server 120 that includes aspects for detecting and mitigating a DoS attack, in an embodiment the edge server(s) 120 transmit SYN packets to the control server(s) 125 that perform the operations of the DoS identification and mitigation module 180.

Figure 3:
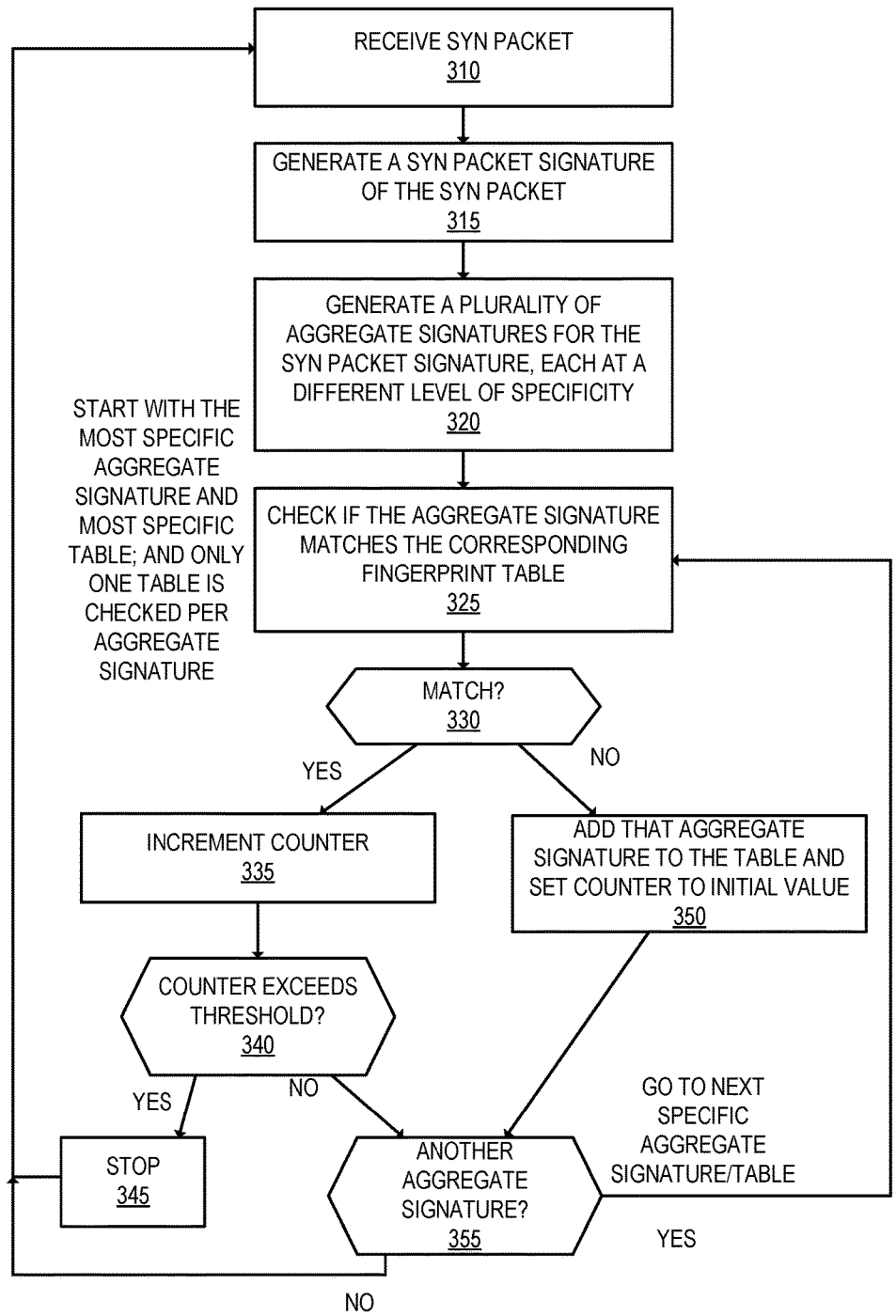
FIG. 3 is a flow diagram that illustrates exemplary operations for identifying and mitigating a denial of service attack, according to an embodiment.

FIG. 3 is a flow diagram that illustrates exemplary operations for identifying and mitigating a denial of service attack, according to an embodiment. The operations of FIG. 3 will be described with respect to the exemplary embodiment of FIG. 2. However, it should be understood that the operations described with respect to FIG. 3 can be performed by embodiments different than those described with respect to FIG. 2, and the embodiment of FIG. 2 can perform operations different than those described with respect to FIG. 3.

At operation 310, a SYN packet is received from one of the client devices 110A-I at the incoming downstream traffic processor 212. The SYN packet may be illegitimate (e.g., part of an attack) or may be legitimate (not part of an attack). The SYN packet may be captured by the edge server. This SYN packet is one of many SYN packets received by the incoming downstream traffic processor 212, which may be directed to the same domain and/or IP address, or may be directed to multiple domains and/or multiple IP addresses. The SYN packet is communicated to the DoS identification and mitigation module 180.

Next, at operation 315, the SYN packet signature generator 220 of the DoS identification and mitigation module 180 generates SYN a packet signature of the received SYN packet. The SYN packet signature may include information from that SYN packet and/or information derived from that SYN packet. The SYN packet signature may describe the SYN packet and include one or more of the following elements: the IP version (e.g., IPv4 or IPv6), an estimated initial TTL value, an IP options length, a maximum segment size (MSS) specified in the TCP options, a window size specified in the TCP header, a window scale specified TCP options, a TCP options layout that lists the TCP options in the order they are seen in the TCP packet (e.g., no-operation, MSS, window scaling, selective ACK permitted, selective ACK, timestamp, end of options followed by x bytes of padding), zero or more quirks (comma separated list of unusual (e.g., ACK number set in a non ACK packet) or incorrect (e.g., malformed TCP options) characteristics of a packet (e.g., "don't fragment" (DF) bit is set in IP header, DF bit is set and IP identification field is non zero, DF bit is not set and IP identification is zero, explicit congestion flag is set, reserved ("must be zero") field in IP header is not zero, flow label in IPv6 header is non-zero, sequence number is zero, ACK field is non-zero but ACK flag is not set, ACK field is zero but ACK flag is set, URG field is non-zero but URG flag not set, URG flag is set, PUSH flag is set, timestamp 1 is zero, timestamp 2 is non-zero in a SYN packet, non-zero data in options segment, excessive window scaling factor (window scale greater than 14), match a packet sent from the Linux network stack (IP.id field equal to TCP.ts1 xor TCP.seq_num), and malformed TCP options), and payload class (TCP payload size). The SYN packet signature may be in the form of a string with separated values such as colon separated values. The SYN packet signatures of attack traffic are often different than SYN packet signatures of legitimate traffic. However, there may be differences among the SYN packet signatures of attack traffic. For instance, different client applications and/or different operating systems may generate SYN packets with different SYN packet signatures, even though they may be part of the same attack. Additionally, client applications may randomly change aspects of the SYN packets that change the SYN packet signatures as part of the same attack.

Next, at operation 320, the aggregate signature generator 230 generates a plurality of aggregate signatures for the SYN packet signature. Each aggregate signature is a pattern that may cover different SYN packet signatures. Each generated aggregate signature may be at a different level of specificity corresponding to a different fingerprint table. Each generated aggregate signature may include at least one generalized value. As an example, a generalized value may be a wildcard value that covers all values or may be an expression that will match multiple different packets such as the value MSS*17 that will match packets where the MSS value multiplied 17 times is equal to the window value. In an embodiment, each aggregate signature is generated such that during normal operation (without an attack), that aggregate signature will cover less than a predefined percentage of SYN packets. For instance, in a specific implementation where K is a size of one table, and K is greater than one (e.g., typically greater than 10 such as 32), each generated aggregate signature will respectively cover less than 1/K of the SYN packets during normal operation. However, the aggregate signature is also generated such that during an attack, the fingerprint may cover more than the predefined percentage of SYN packets (e.g., more than 1/K of the SYN packets). It is possible for the fingerprint will cover more than the predefined percentage of SYN packets during normal operation (e.g., more than the 1/K of the SYN packets), but not exceed the attack threshold. This guards against legitimate streams that are larger than 1/K but do not exceed an attack threshold. Also, the aggregate signature is generic enough that it can detect attacks with randomized fields.

As an example, the following aggregate signatures may be generated for the following SYN packet signature received at 192.0.2.16/24 (in order from most specific to least specific) signature: 4:64:0:1440:14400,6:mss,sok,ts,nop,ws:df,id+,linux:0 aggregate signatures: (1-16 are applicable for 192.02.16/24, and 17-32 are applicable for 192.0.2.0/24):

(1) 4:64:0:1440:mss*10,6:mss,sok,ts,nop,ws:df,id+,linux:0
(2) 4:64:0:1440:mss*10,*:mss,sok,ts,nop,ws:df,id+,linux:0
(3) 4:64:0:1440:*,6:mss,sok,ts,nop,ws:df,id+,linux:0
(4) 4:64:0:1440:*,*:mss,sok,ts,nop,ws:df,id+,linux:0
(5) 4:64:0:*:mss*10,6:mss,sok,ts,nop,ws:df,id+,linux:0
(6) 4:64:0:*:mss*10,*:mss,sok,ts,nop,ws:df,id+,linux:0
(7) 4:64:0:*:*,6:mss,sok,ts,nop,ws:df,id+,linux:0
(8) 4:64:0:*:*,*:mss,sok,ts,nop,ws:df,id+,linux:0
(9) 4:*:0:1440:mss*10,6:mss,sok,ts,nop,ws:df,id+,linux:0
(10) 4:*:0:1440:mss*10,*:mss,sok,ts,nop,ws:df,id+,linux:0
(11) 4:*:0:1440:*,6:mss,sok,ts,nop,ws:df,id+,linux:0
(12) 4:*:0:1440:*,*:mss,sok,ts,nop,ws:df,id+,linux:0
(13) 4:*:0:*:mss*10,6:mss,sok,ts,nop,ws:df,id+,linux:0
(14) 4:*:0:*:mss*10,*:mss,sok,ts,nop,ws:df,id+,linux:0
(15) 4:*:0:*:*,6:mss,sok,ts,nop,ws:df,id+,linux:0
(16) 4:*:0:*:*,*:mss,sok,ts,nop,ws:df,id+,linux:0
(17) 4:64:0:1440:mss*10,6:mss,sok,ts,nop,ws:df,id+,linux:0
(18) 4:64:0:1440:mss*10,*:mss,sok,ts,nop,ws:df,id+,linux:0
(19) 4:64:0:1440:*,6:mss,sok,ts,nop,ws:df,id+,linux:0
(20) 4:64:0:1440:*,*:mss,sok,ts,nop,ws:df,id+,linux:0
(21) 4:64:0:*:mss*10,6:mss,sok,ts,nop,ws:df,id+,linux:0
(22) 4:64:0:*:mss*10,*:mss,sok,ts,nop,ws:df,id+,linux:0
(23) 4:64:0:*:*,6:mss,sok,ts,nop,ws:df,id+,linux:0
(24) 4:64:0:*:*,*:mss,sok,ts,nop,ws:df,id+,linux:0
(25) 4:*:0:1440:mss*10,6:mss,sok,ts,nop,ws:df,id+,linux:0
(26) 4:*:0:1440:mss*10,*:mss,sok,ts,nop,ws:df,id+,linux:0
(27) 4:*:0:1440:*,6:mss,sok,ts,nop,ws:df,id+,linux:0
(28) 4:*:0:1440:*,*:mss,sok,ts,nop,ws:df,id+,linux:0
(29) 4:*:0:*:mss*10,6:mss,sok,ts,nop,ws:df,id+,linux:0
(30) 4:*:0:*:mss*10,*:mss,sok,ts,nop,ws:df,id+,linux:0
(31) 4:*:0:*:*,6:mss,sok,ts,nop,ws:df,id+,linux:0
(32) 4:*:0:*:*,*:mss,sok,ts,nop,ws:df,id+,linux:0

As shown in the aggregate signatures, the window size, window scale, MSS, and/or initial TTL value has been generalized in certain aggregate signatures. Also has shown above, there are 32 aggregate signatures generated for 32 different fingerprint tables.

After generating the fingerprints, the iterator 225 of the DoS identification and mitigation module 180 sequentially iterates through the fingerprint tables 235 starting with the most specific aggregate signature and the most specific fingerprint table until a match exceeding a threshold is found. If there is a match in a specific fingerprint table, the iterator 225 increments a corresponding counter for that fingerprint and checks to determine if the counter exceeds a threshold. If the counter exceeds the threshold, then counting stops. If there is not a match of an aggregate signature in the corresponding fingerprint table, the iterator 225 causes the aggregate signature to be installed in that corresponding fingerprint table and an initial counter to be set. These operations will be described with respect to operations 325-355.

Figure 4:
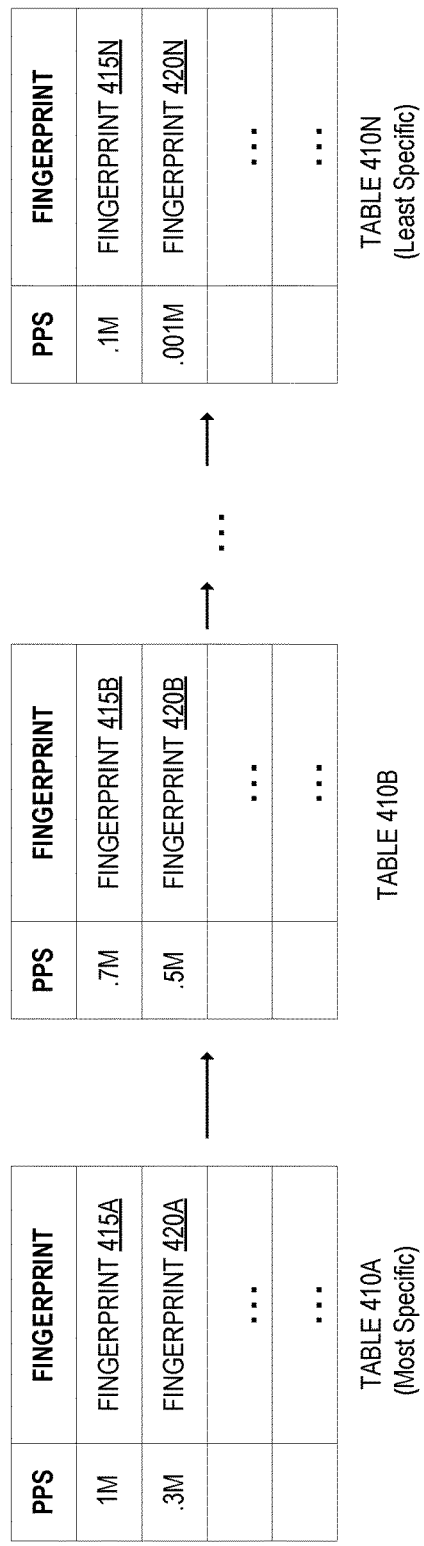
FIG. 4 illustrates an example of the fingerprint tables.

At operation 325, the iterator 225 (starting with the most specific aggregate signature and the most specific fingerprint table) compares that aggregate signature to the corresponding fingerprint table to check if there is a match. The iterator 225 compares the aggregate signature to only the corresponding fingerprint table. FIG. 4 illustrates an example of the fingerprint tables 235. As shown in FIG. 4, the fingerprint tables 235 include the most specific table 410A, the next specific table 410B, and the least specific table (the most generic) 410N. The most specific table 410A includes fingerprints that are generated to be the most specific (e.g., the least amount of generalized values) and the least specific table 410N includes fingerprints that are generated to be least specific (e.g., the most number of generalized values). The fingerprint tables include entries for a counter (represented in FIG. 4 as packet-per-second) that is associated with a fingerprint. For example, the fingerprint 415A is associated with the counter that currently has a value of 1 million, the fingerprint 415B (which is a more generic fingerprint than fingerprint 415A) has a counter value of 7 million, the fingerprint 415N (which is a more generic fingerprint than fingerprint 415B) has a counter value of 0.1 million. Similarly, fingerprint 420A is associated with the counter that currently has a value of 0.3 million, the fingerprint 420B (which is a more generic fingerprint than fingerprint 420A) has a counter value of 5 million, the fingerprint 420N (which is a more generic fingerprint than fingerprint 420B) has a counter value of 0.001 million. For example, if the most specific aggregate signature is being evaluated, the iterator 225 compares that aggregate signature with the most specific fingerprint table 410A.

Flow then moves to operation 330 where the iterator 225 determines if there is a match of that aggregate signature to the corresponding fingerprint table. If there is a match, then flow moves to operation 335 where the iterator 225 causes the counter to be incremented. For example, if the most specific aggregate signature matches the fingerprint 415A, the corresponding counter will be incremented. Then, at operation 340, the iterator 225 determines whether the value of the counter exceeds a threshold (e.g., a traffic volume threshold such as a packet-per-second threshold). If the counter exceeds the threshold, then flow moves to operation 345 where counting stops. If the counter does not exceed the threshold, then the next aggregate signature is compared to the next fingerprint table to check for a match. Thus, at operation 355, the iterator 225 determines if there is another one of the plurality of aggregate signatures to check. If there is another aggregate signature to check, then the operations flow to operation 325 where the iterator 225 checks that aggregate signature against the next most specific aggregate table. If there is not another aggregate signature to check, then the operations flow back to operation 310 if another SYN packet is received.

Referring to operation 330, if the aggregate signature does not match a fingerprint in the corresponding fingerprint table, then flow moves to operation 350 where the iterator 225 causes that aggregate signature to be added into that corresponding fingerprint table and the corresponding counter is set to an initial value (e.g., 0, 1, or any other initial value). Flow then moves from operation 350 to operation 355.

Figure 5:
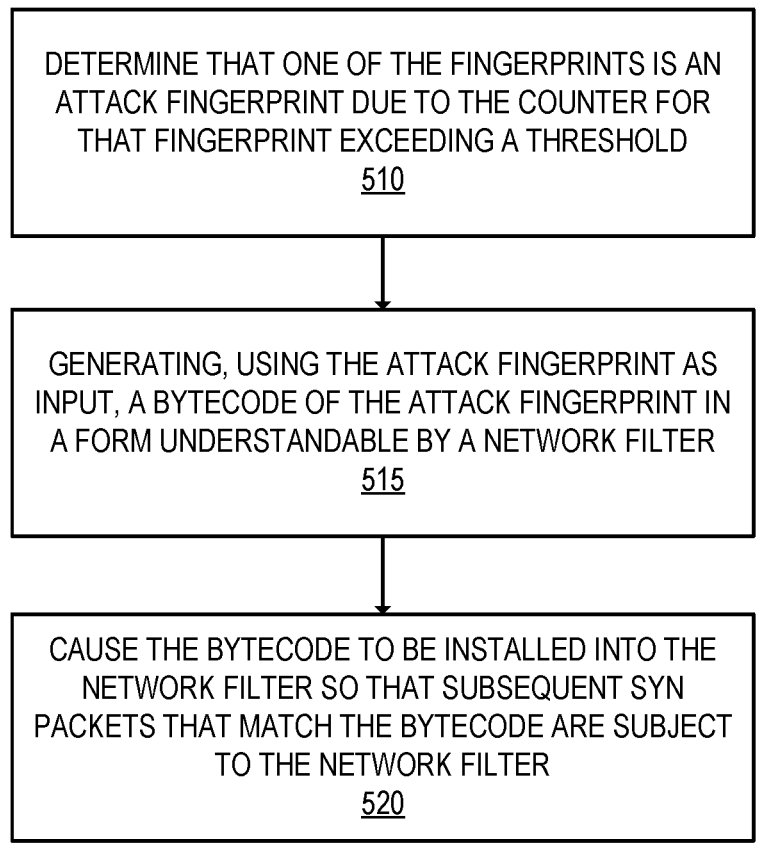
FIG. 5 is a flow diagram illustrating exemplary operations for identifying and mitigating a denial of service attack, according to an embodiment.

FIG. 5 is a flow diagram illustrating exemplary operations for identifying and mitigating a denial of service attack, according to an embodiment. The operations of FIG. 5 will be described with respect to the exemplary embodiment of FIG. 2. However, the operations described with respect to FIG. 5 can be performed by embodiments different than those described with respect to FIG. 2, and the embodiment of FIG. 2 can perform operations different than those described with respect to FIG. 5. The operations of FIG. 5 can be performed periodically.

The DoS identification and mitigation module 180 determines whether there is a fingerprint that is indicative of an attack through if a counter for the fingerprint exceeds a threshold (e.g., a traffic volume threshold). The DoS identification and mitigation module 180 may periodically iterate through the fingerprint tables 235 to determine whether there is a fingerprint whose corresponding counter exceeds a threshold.

At operation 510, the DoS identification and mitigation module 180 determines that one of the fingerprints is an attack fingerprint due to the counter for that fingerprint exceeding a threshold. The threshold is a predefined number that may be changed depending on what is considered to be an attack.

The form of the attack fingerprint itself may not be in the form that can be acted on quickly by the server for matching attack traffic that corresponds with the fingerprint. In such a case, the attack fingerprint(s) are converted to a form that can be used quickly by the server, such as by a network filter. In an embodiment, the network filter is an implementation of a Berkeley Packet Filter (BPF) (e.g., iptables xt_bpf module) and the format understandable by the network filter is BPF bytecode. Thus, at operation 515, the bytecode generator 240 generates, using the attack fingerprint as input, a bytecode of the attack fingerprint in a form that is understandable to the network filter 294. The bytecode generator 240 may take as input a fingerprint, parse and split the elements into matches, and output a packet filter expression that is understandable by the network filter 294.

Next, at operation 520, the generated bytecode 245 is installed in the network filter 294 so that subsequent SYN packets that match the bytecode are subject to the network filter. As an example, the network filter may be attached to the network tap interface. The network filter 294 may cause the incoming downstream traffic processor 212 to drop or rate limit SYN packets that match the bytecode(s) 245.

While FIG. 3 has been described as being performed by an edge server 120, in another embodiment, a centralized server (e.g., a control server 125) may perform operations similar to 315-355. In such an embodiment, the edge server(s) 120 receive SYN packets and periodically send the SYN packets, or a sample of the SYN packets, to the centralized server (e.g., using sFlow). The centralized server would then perform similar operations to that of operations 315-355. While FIG. 5 has been described as being performed by an edge server 120, in another embodiment, a centralized server (e.g., a control server 125) may perform operations similar to operations 510-520. In such an embodiment, the centralized server determines if there is an attack, generates bytecode for a fingerprint determined to match an attack, and causes that bytecode to be installed in one or more network filters on one or more edge servers.

While embodiments have been described with respect to a proxy service, in other embodiments, the detection and mitigation techniques described herein can be performed on a non-proxy web server, such as an origin server.

Figure 6:
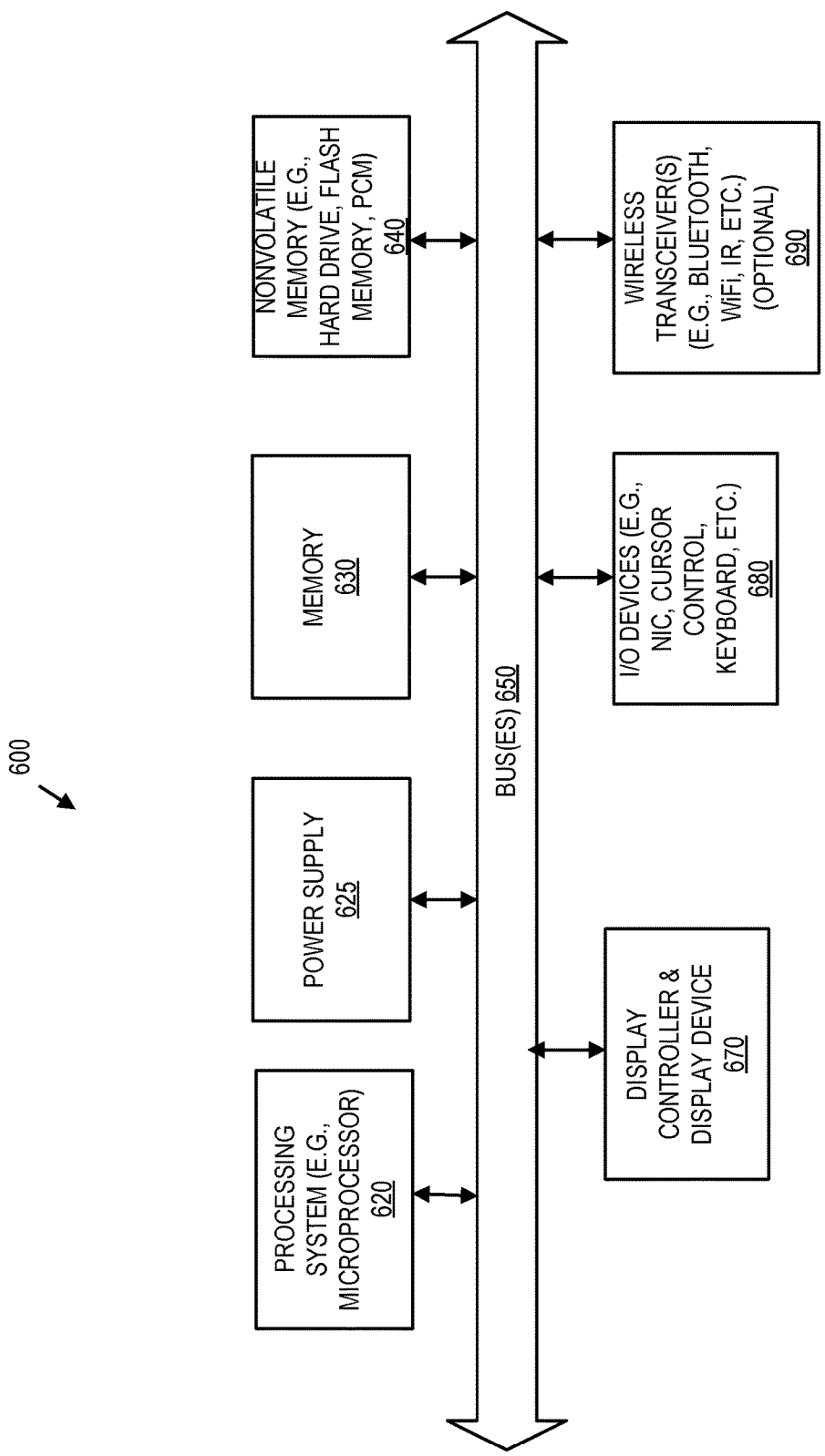
FIG. 6 is a block diagram illustrating a data processing system that can be used in an embodiment.

FIG. 6 illustrates an exemplary computer system. As illustrated in FIG. 6, the computer system 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from cache, memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). One or more of the components of the computer system is optional. In one embodiment, the client device, edge server, and/or control server described herein may take the form of the computer system 600.

The techniques shown in the figures can be implemented using code and data stored and executed on one or more computing devices (e.g., client device, edge server, control server, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server, comprising:
   receiving a first SYN packet;
   generating a first SYN packet signature of the first SYN packet, wherein the first SYN packet signature describes the first SYN packet, and wherein the first SYN packet signature includes a plurality of elements;
   generating a first plurality of aggregate signatures for the first SYN packet signature, wherein each of the plurality of aggregate signatures includes the plurality of elements, wherein each of the first plurality of aggregate signatures includes a generalized value for at least one of the plurality of elements, wherein each respective one of the first plurality of aggregate signatures has a different level of specificity that corresponds with one of a plurality of fingerprint tables, and wherein each fingerprint table includes a set of one or more fingerprints and a set of one or more counters respectively;
   for each of the first plurality of aggregate signatures starting with a most specific one of the first plurality of aggregate signatures and corresponding fingerprint table and moving to a next most specific one of the first plurality of aggregate signatures and corresponding fingerprint table until one of the set of counters exceeds a threshold, performing the following:
      comparing that aggregate signature with the set of one or more fingerprints of that fingerprint table to determine whether that aggregate signature matches one of the set of fingerprints in that fingerprint table;
      responsive to determining that the aggregate signature matches one of the set of one or more fingerprints of that fingerprint table,
         incrementing the counter that corresponds with that matching fingerprint,
         responsive to determining that the counter exceeds the threshold, stopping the counting and outputting that aggregate signature as an attack fingerprint;

generating, using the attack fingerprint as input, a bytecode of the attack fingerprint in a form understandable by a network filter; and
   causing the generated bytecode to be installed into the network filter so that subsequent SYN packets that are received and match the generated bytecode are subject to the network filter.

2. The method of claim 1, wherein generating the first plurality of aggregate signatures for the first SYN packet signature includes determining which one or more of the plurality of elements to change to a generalized value based on heuristic analysis.

3. The method of claim 1, wherein generating, using the attack fingerprint as input, the bytecode for the network filter includes parsing and splitting the plurality of elements into matches of the bytecode and outputting a packet filter expression understandable by the network filter.

4. The method of claim 1, wherein causing the bytecode to be installed in the network filter includes transmitting the bytecode to an edge server to be installed in a network filter of the edge server.

5. The method of claim 1, wherein the network filter is an implementation of a Berkeley Packet Filter (BPF) and the bytecode is BPF bytecode.

6. The method of claim 1, wherein subsequent SYN packets that match the generated bytecode are to be dropped or rate limited according to the network filter.

7. The method of claim 1, further comprising:
   receiving a second SYN packet;
   generating a second SYN packet signature of the second SYN packet, wherein the second SYN packet signature describes the second SYN packet, and wherein the second SYN packet signature includes the plurality of elements;
   generating a second plurality of aggregate signatures for the second SYN packet signature, wherein each of the second plurality of aggregate signatures includes the plurality of elements, wherein each of the second plurality of aggregate signatures includes a generalized value for at least one of the plurality of elements, and wherein each respective one of the second plurality of aggregate signatures has a different level of specificity that corresponds with one of the plurality of fingerprint tables; and
   for each of the second plurality of aggregate signatures starting with a most specific one of the second plurality of aggregate signatures and corresponding fingerprint table and moving to a next most specific one of the second plurality of aggregate signatures and corresponding fingerprint table until one of the set of counters exceeds a threshold, performing the following:
      comparing that aggregate signature with the set of one or more fingerprints of that fingerprint table to determine whether that aggregate signature matches one of the set of fingerprints in that fingerprint table;
      responsive to determining that the aggregate signature does not match one of the set of one or more fingerprints of that fingerprint table,
         including that aggregate signature in that fingerprint table, and
         setting an initial counter value.

8. A non-transitory machine-readable storage medium that provides instructions that, if executed by a processor, will cause said processor to perform operations comprising:
   receiving a first SYN packet;
   generating a first SYN packet signature of the first SYN packet, wherein the first SYN packet signature describes the first SYN packet, and wherein the first SYN packet signature includes a plurality of elements;

generating a first plurality of aggregate signatures for the first SYN packet signature, wherein each of the plurality of aggregate signatures includes the plurality of elements, wherein each of the first plurality of aggregate signatures includes a generalized value for at least one of the plurality of elements, wherein each respective one of the first plurality of aggregate signatures has a different level of specificity that corresponds with one of a plurality of fingerprint tables, and wherein each fingerprint table includes a set of one or more fingerprints and a set of one or more counters respectively;

for each of the first plurality of aggregate signatures starting with a most specific one of the first plurality of aggregate signatures and corresponding fingerprint table and moving to a next most specific one of the first plurality of aggregate signatures and corresponding fingerprint table until one of the set of counters exceeds a threshold, perform the following:

comparing that aggregate signature with the set of one or more fingerprints of that fingerprint table to determine whether that aggregate signature matches one of the set of fingerprints in that fingerprint table;

responsive to determining that the aggregate signature matches one of the set of one or more fingerprints of that fingerprint table, incrementing the counter that corresponds with that matching fingerprint, responsive to determining that the counter exceeds the threshold, stopping the counting and outputting that aggregate signature as an attack fingerprint;

generating, using the attack fingerprint as input, a bytecode of the attack fingerprint in a form understandable by a network filter; and causing the generated bytecode to be installed into the network filter so that subsequent SYN packets that are received and match the generated bytecode are subject to the network filter.

9. The non-transitory machine-readable storage medium of claim 8, wherein generating the first plurality of aggregate signatures for the first SYN packet signature includes determining which one or more of the plurality of elements to change to a generalized value based on heuristic analysis.

10. The non-transitory machine-readable storage medium of claim 8, wherein generating, using the attack fingerprint as input, the bytecode for the network filter includes parsing and splitting the plurality of elements into matches of the bytecode and outputting a packet filter expression understandable by the network filter.

11. The non-transitory machine-readable storage medium of claim 8, wherein causing the bytecode to be installed in the network filter includes transmitting the bytecode to an edge server to be installed in a network filter of the edge server.

12. The non-transitory machine-readable storage medium of claim 8, wherein the network filter is an implementation of a Berkeley Packet Filter (BPF) and the bytecode is BPF bytecode.

13. The non-transitory machine-readable storage medium of claim 8, wherein subsequent SYN packets that match the generated bytecode are to be dropped or rate limited according to the network filter.

14. The non-transitory machine-readable storage medium of claim 8 further provides instructions that, when executed by the processor, cause said processor to further perform operations:

receive a second SYN packet;

generating a second SYN packet signature of the second SYN packet, wherein the second SYN packet signature describes the second SYN packet, and wherein the second SYN packet signature includes the plurality of elements;

generating a second plurality of aggregate signatures for the second SYN packet signature, wherein each of the second plurality of aggregate signatures includes the plurality of elements, wherein each of the second plurality of aggregate signatures includes a generalized value for at least one of the plurality of elements, and wherein each respective one of the second plurality of aggregate signatures has a different level of specificity that corresponds with one of the plurality of fingerprint tables; and for each of the second plurality of aggregate signatures starting with a most specific one of the second plurality of aggregate signatures and corresponding fingerprint table and moving to a next most specific one of the second plurality of aggregate signatures and corresponding fingerprint table until one of the set of counters exceeds a threshold, perform the following:

comparing that aggregate signature with the set of one or more fingerprints of that fingerprint table to determine whether that aggregate signature matches one of the set of fingerprints in that fingerprint table;

responsive to determining that the aggregate signature does not match one of the set of one or more fingerprints of that fingerprint table, including that aggregate signature in that fingerprint table, and setting an initial counter value.

15. A server, comprising:

a processor; and a non-transitory machine-readable storage medium coupled with the processor and provides instructions that, when executed by the processor, causes the processor to perform operations comprising:

receive a first SYN packet;

generate a first SYN packet signature of the first SYN packet, wherein the first SYN packet signature describes the first SYN packet, and wherein the first SYN packet signature is to include a plurality of elements;

generate a first plurality of aggregate signatures for the first SYN packet signature, wherein each of the plurality of aggregate signatures is to include the plurality of elements, wherein each of the first plurality of aggregate signatures is to include a generalized value for at least one of the plurality of elements, wherein each respective one of the first plurality of aggregate signatures is to have a different level of specificity that corresponds with one of a plurality of fingerprint tables, and wherein each fingerprint table is to include a set of one or more fingerprints and a set of one or more counters respectively;

for each of the first plurality of aggregate signatures starting with a most specific one of the first plurality of aggregate signatures and corresponding fingerprint table and moving to a next most specific one of the first plurality of aggregate signatures and corresponding fingerprint table until one of the set of counters exceeds a threshold, performing the following:
  compare that aggregate signature with the set of one or more fingerprints of that fingerprint table to determine whether that aggregate signature matches one of the set of fingerprints in that fingerprint table;
  responsive to a determination that the aggregate signature matches one of the set of one or more fingerprints of that fingerprint table,
    increment the counter that corresponds with that matching fingerprint,
    responsive to a determination that the counter exceeds the threshold, stop the counting and outputting that aggregate signature as an attack fingerprint;
generate, using the attack fingerprint as input, a bytecode of the attack fingerprint in a form understandable by a network filter; and
cause the generated bytecode to be installed into the network filter so that subsequent SYN packets that are received and match the generated bytecode are subject to the network filter.

16. The server of claim 15, wherein generation of the first plurality of aggregate signatures for the first SYN packet signature includes a determination of which one or more of the plurality of elements to change to a generalized value based on heuristic analysis.

17. The server of claim 15, wherein generate, using the attack fingerprint as input, the bytecode for the network filter includes parsing and splitting the plurality of elements into matches of the bytecode and outputting a packet filter expression understandable by the network filter.

18. The server of claim 15, wherein causal of the bytecode to be installed in the network filter includes a transmission of the bytecode to an edge server to be installed in a network filter of the edge server.

19. The server of claim 15, wherein the network filter is to be an implementation of a Berkeley Packet Filter (BPF) and the bytecode is BPF bytecode.

20. The server of claim 15, wherein subsequent SYN packets that match the generated bytecode are to be dropped or rate limited according to the network filter.

21. The server of claim 15, wherein the non-transitory machine-readable storage medium further provides instructions that, when executed by the processor, cause said processor to further perform operations:
receive a second SYN packet;
generate a second SYN packet signature of the second SYN packet, wherein the second SYN packet signature is to describe the second SYN packet, and wherein the second SYN packet signature is to include the plurality of elements;
generate a second plurality of aggregate signatures for the second SYN packet signature, wherein each of the second plurality of aggregate signatures is to include the plurality of elements, wherein each of the second plurality of aggregate signatures is to include a generalized value for at least one of the plurality of elements, and wherein each respective one of the second plurality of aggregate signatures is to have a different level of specificity that corresponds with one of the plurality of fingerprint tables; and
for each of the second plurality of aggregate signatures starting with a most specific one of the second plurality of aggregate signatures and corresponding fingerprint table and moving to a next most specific one of the second plurality of aggregate signatures and corresponding fingerprint table until one of the set of counters exceeds a threshold, perform the following:
  compare that aggregate signature with the set of one or more fingerprints of that fingerprint table to determine whether that aggregate signature matches one of the set of fingerprints in that fingerprint table;
  responsive to a determination that the aggregate signature does not match one of the set of one or more fingerprints of that fingerprint table,
    include that aggregate signature in that fingerprint table, and
    set an initial counter value.

* * * * *